United States Patent [19]

Takasaki

[11] Patent Number: 5,175,639
[45] Date of Patent: Dec. 29, 1992

[54] OPTICAL SUBSCRIBER NETWORK TRANSMISSION SYSTEM

[75] Inventor: Yoshitaka Takasaki, Tokorozawa, Japan

[73] Assignee: Hitachi, Ltd., Tokyo, Japan

[21] Appl. No.: 512,628

[22] Filed: Apr. 19, 1990

Related U.S. Application Data

[63] Continuation-in-part of Ser. No. 123,463, Nov. 20, 1987, abandoned.

[30] Foreign Application Priority Data

Nov. 21, 1986 [JP] Japan .................. 61-276557

[51] Int. Cl.⁵ .................. H04B 9/00
[52] U.S. Cl. .................. 359/118; 359/125; 370/16
[58] Field of Search .................. 370/1, 3, 4, 16

[56] References Cited

U.S. PATENT DOCUMENTS

| | | | |
|---|---|---|---|
| 4,573,215 | 7/1986 | Oates et al. | 350/96.16 |
| 4,627,105 | 12/1986 | Ohashi et al. | 370/3 |
| 4,658,394 | 4/1987 | Cheng et al. | 370/3 |
| 4,680,776 | 7/1987 | Ikeuchi et al. | 370/16 |
| 4,696,060 | 9/1987 | Oswald | 370/16 |
| 4,769,807 | 9/1988 | Niwa | 370/16 |
| 4,774,703 | 9/1988 | Force | 370/16 |
| 4,775,971 | 10/1988 | Bergmann | 370/3 |
| 4,797,879 | 1/1989 | Habbab | 370/3 |
| 4,829,512 | 5/1989 | Nakai | 370/16 |
| 4,831,617 | 5/1989 | Iwasaki | 370/16 |
| 4,837,760 | 6/1989 | Reid | 370/16 |
| 4,847,837 | 7/1989 | Morales | 370/16 |

OTHER PUBLICATIONS

Stauffer, "FT3C-A Lightwave System for Metropolitan and Intercity Applications"; *I.E.E.E. Journal on Selected Areas in Comunications*; vol. SAC-1, No. 3, Apr. 1983, pp. 413-419.

*Primary Examiner*—Curtis Kuntz
*Assistant Examiner*—Leslie Pascal
*Attorney, Agent, or Firm*—Pennie & Edmonds

[57] ABSTRACT

The present invention relates to an optical subscriber network transmission system which comprises a first optical transmission line whiich transmits information from a center to a subscriber, a second optical transmission line which transmits information from the subscriber to the center, and an auxiliary optical transmission line which is laid between the center and the subscriber.

12 Claims, 7 Drawing Sheets

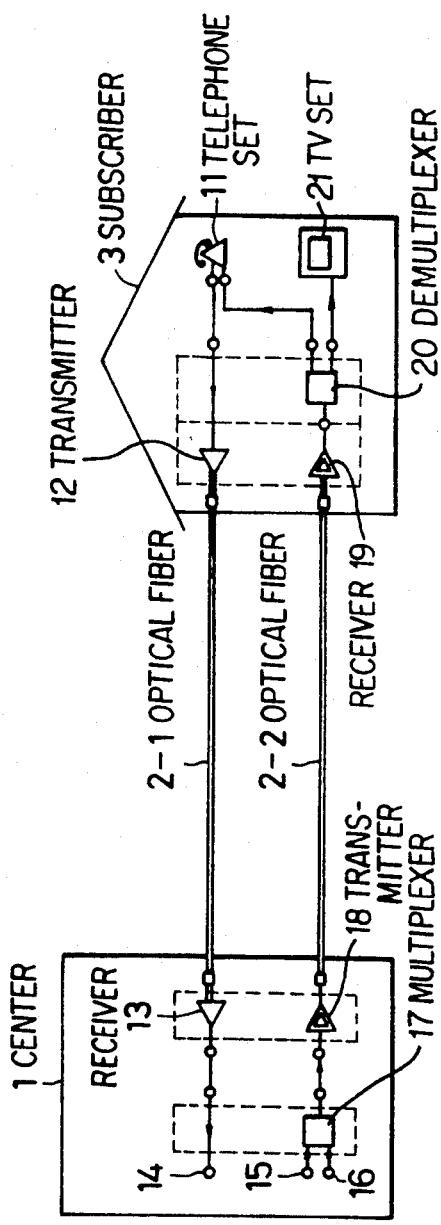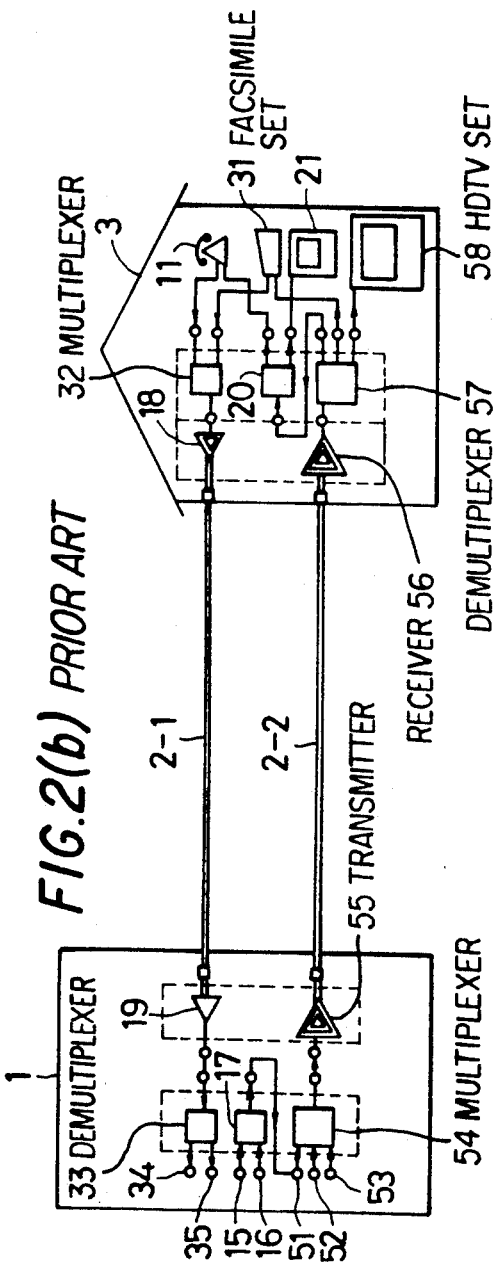
FIG.2(a) PRIOR ART
FIG.2(b) PRIOR ART

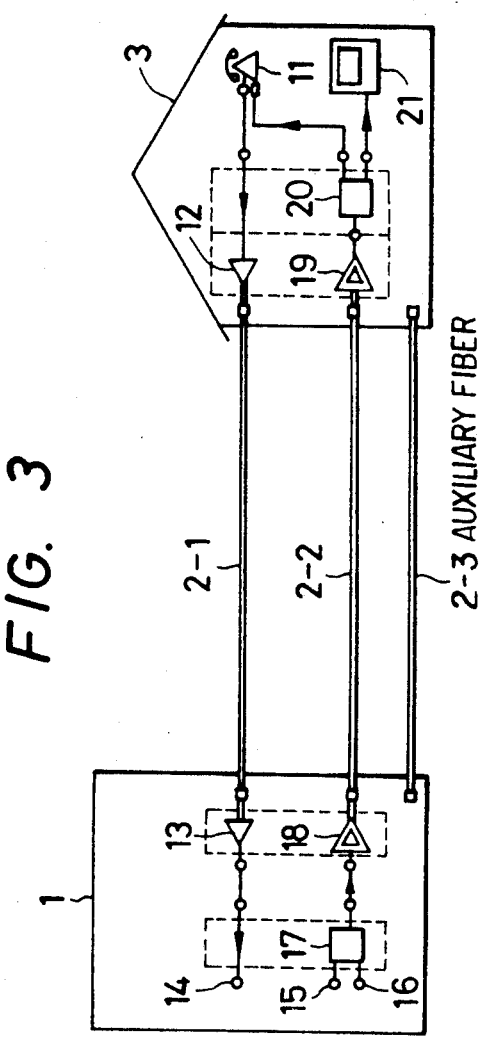

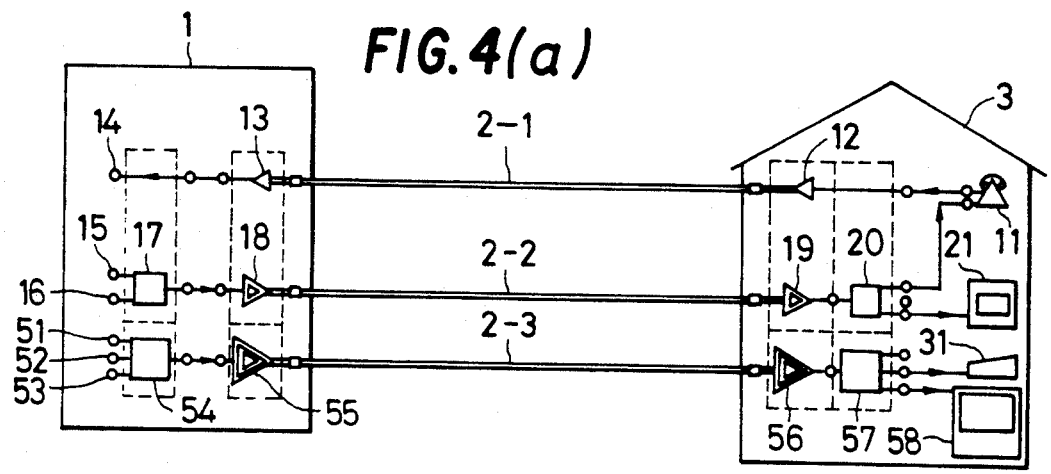
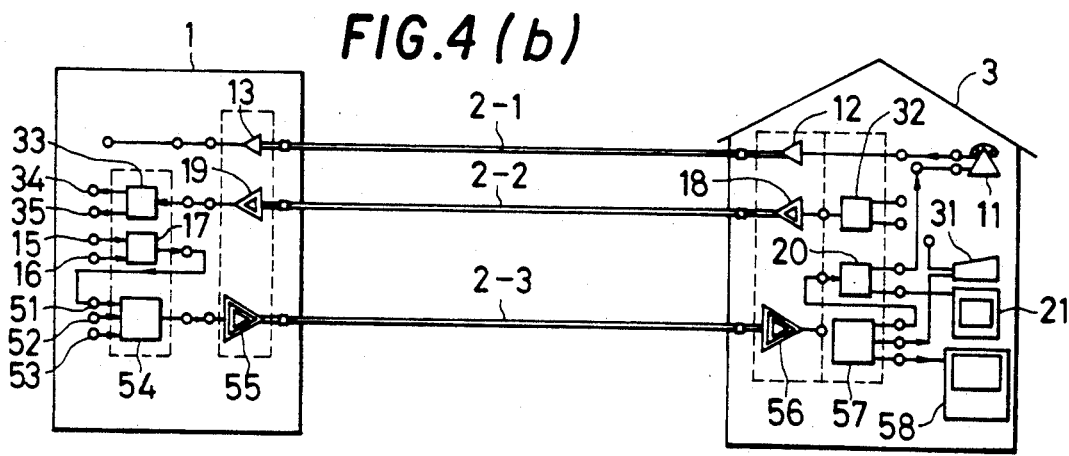
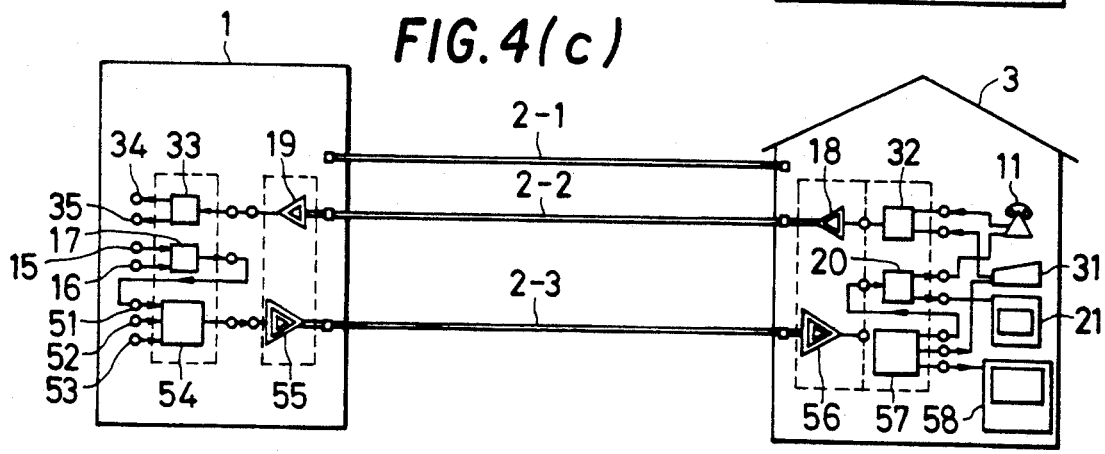

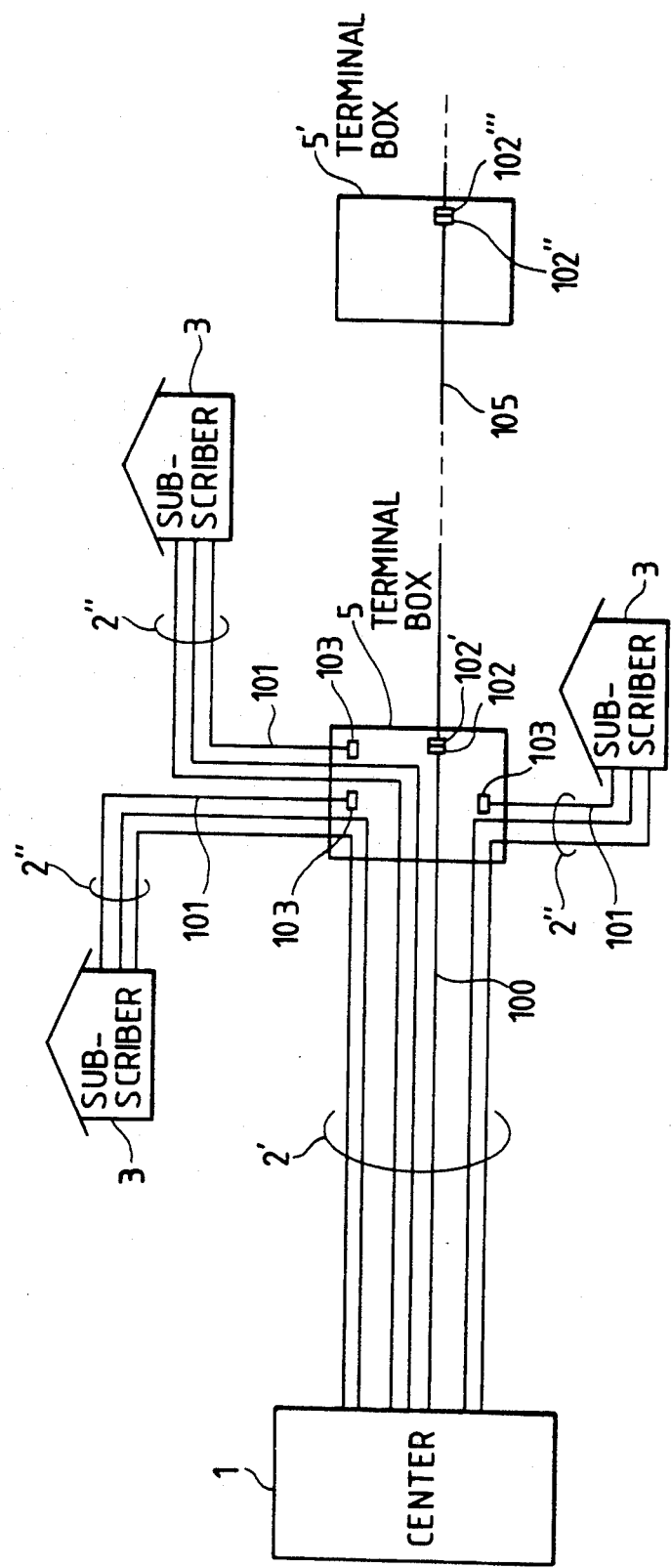

OPTICAL SUBSCRIBER NETWORK TRANSMISSION SYSTEM

This is a continuation-in-part of application Ser. No. 07/123,463, filed Nov. 20, 1987 now abandoned.

BACKGROUND OF THE INVENTION:

The present invention relates to an optical subscriber network transmission system, and more particularly to a network transmission system which is well suited to smoothly enlarge a transmission capacity when needed, for example, if information require substantial transmission capacity is offered to subscribers by the use of single-mode optical fibers.

An example of a network which offers various services with optical fibers, is shown in FIG. 1. Service information items are transmitted from a center 1 to individual subscribers 3 through optical fibers 2. As the contents of the services, there are mentioned conventional audio-telephone, and besides, facsimile, pay TV, high-definition TV, etc. A system of this type is described in, for example, "Integrated Circuit for Broad-Band Communications Systems" by H. Reiner, IEEE JOURNAL ON SELECTED AREA IN COMMUNICATIONS. VOL. SAC-4, NO. 4, JULY 1986, pp. 480-487.

The services can be classified into symmetric and asymmetric types. That is, the services such as telephone and facsimile in which the information rates of a transmission line from the center to each subscriber (downstream transmission line) and a transmission line from the subscriber to the center (upstream transmission line) are equal to each other are called the symmetric type, while the services such as pay TV and high-definition TV in which the capacity of the downstream transmission line is larger are called the asymmetric type.

In general, in an optical subscriber system, the symmetric and asymmetric services are multiplexed and then transmitted by the upstream and downstream transmission lines. Therefore, the transmission capacity of the downstream transmission line becomes larger than that of the upstream transmission line.

In addition, single-mode fibers of very broad band are employed for the transmission of signals between the center and the subscriber. Therefore, even if the subscriber should wish to subscribe in the future to services requiring still larger transmission capacity, only the transmitter and a receiver need be replaced with ones for higher capacity transmission of information, while the laid fibers are used as they are.

In particular, a transmitter and a receiver having been used for the downstream transmission line can be diverted to the upstream transmission line and a transmitter and a receiver of larger capacity can be installed anew for the downstream transmission line. This is more economic owing to the effective utilization of the existing facilities than a measure in which transmitters and receivers are installed anew for both the upstream and downstream transmission lines. This will be elucidated with reference to FIGS. 2(a) and 2(b).

FIG. 2(a) shows the connections between the center 1 and the subscriber 3 in the case where telephone and pay TV are subscribed to. Via the optical fiber 2-1 of the upstream transmission line, a voice signal from a telephone set 11 is transmitted to the center 1 by a transmitter 12 and is received by a receiver 13.

On the other hand, as regards the downstream transmission line, a voice signal is applied to a terminal 15, while a pay TV signal is applied to a terminal 16, and the signals are multiplexed by a multiplexer 17. The multiplexed signal is transmitted by a transmitter 18 and received by a receiver 19 via the optical fiber 2-2 of the downstream transmission line. The received signal is demultiplexed by a demultiplexer 20 into the voice signal and the pay TV signal, which are respectively applied to the telephone set 11 and a TV receiving set 21.

An example in which facsimile and high-definition TV are further added to this system, is shown in FIG. 2(b). In this case, the voice signal from the telephone set 11 and also a facsimile signal from a facsimile set 31 are multiplexed on the upstream transmission line by a multiplexer 32, whereupon the multiplexed signal is transmitted center 1. In the center, this signal is demultiplexed into the voice signal and the facsimile signal by a demultiplexer 33.

As regards the downstream transmission line, the multiplexed signal of the voice and pay TV signals applied to the terminal 51 of a multiplexer 54, a facsimile signal applied to the terminal 52 thereof and a high-definition TV signal applied to the terminal 53 thereof are multiplexed and then transmitted. The multiplexed signal is demultiplexed by a demultiplexer 57 on the reception side, and the demultiplexed signals are applied to the respective receiving sets.

In changing-over the system of FIG. 2(a) to that of FIG. 2(b), it is economical that the transmitter and receiver 18, 19 for the downstream transmission line of the system in FIG. 2(a) are diverted for the upstream transmission line of the system in FIG. 2(b). On account of the change-over work, however, the operation of the system needs to be stopped for a considerably long term. More specifically, in the system of FIG. 2(a), the transmitter 18 and the receiver 19 are detached and are respectively substituted for the transmitter 12 and the receiver 13, whereupon the transmission line is tested. Next, the multiplexers 32 and 33 are added to the transmission line as illustrated in FIG. 2(b), and the overall test of the upstream transmission line is conducted. In addition, a transmitter 55 and a receiver 56 are added anew to the optical fiber 2-2 of the downstream transmission line, and a transmission test is conducted. Thereafter, the multiplexer 54 and the demultiplexer 57 are added, and the overall test of the downstream transmission line is conducted. Lastly, the overall test of the upstream and downstream transmission lines is conducted. When the tests in such a procedure are collectively executed for several subscribers or ten odd subscribers, it is sometimes the case that interruption of service for a week or more is necessitated.

SUMMARY OF THE INVENTION

An object of the present invention is to shorten to the utmost the term of the service interruption during the change-over of the transmission line capacities as stated above.

As will be described later, the aforementioned problem is solved in such a way that, separately from optical transmission lines for transmission and reception, a auxillary optical transmission line is laid beforehand. These optical transmission lines are constructed of, for example, optical fibers.

According to the present invention, a auxiliary fiber is prepared. For this reason, three optical fibers are required for each subscriber though two optical fibers have hitherto been sufficient. In recent years, however, the cost of the optical fibers has been rapidly dropping. Since the optical fibers are collectively laid as a cable, the increase of cost attributed to the increased number of the optical fibers is so slight as to be almost negligible when compared with the cost of the cable and the expense of the work for laying the cable. To the contrary, a cost reduction effect is achieved by shortening the term of the change-over work by the use of the spare fiber.

Thus, a part of a new transmission line is constructed using the auxiliary fiber, and the test of the new transmission line is completed without interrupting any service. Thereafter, the service of an existing transmission line is switched to the new transmission line. Subsequently, the fiber of the existing transmission line, which is now unnecessary for this transmission line, is used as an auxiliary fiber, and successive change-over operations are performed. In this way, the interruption of services can be suppressed to the minimum.

BRIEF DESCRIPTION OF THE DRAWINGS

FIGS. 2(a) and 2(b) are diagrams respectively showing examples of transmission line arrangements before and after the enlargement of a service capacity in the case where a specified subscriber is taken out from FIG. 1 and is viewed;

FIG. 3, FIGS. 4(a)-4(c) and FIGS. 5(a)-5(c) are diagrams each showing an embodiment of the present invention;

FIG. 8 shows an embodiment of the present invention having a second extended auxiliary line.

PREFERRED EMBODIMENTS OF THE INVENTION

Figure 1:
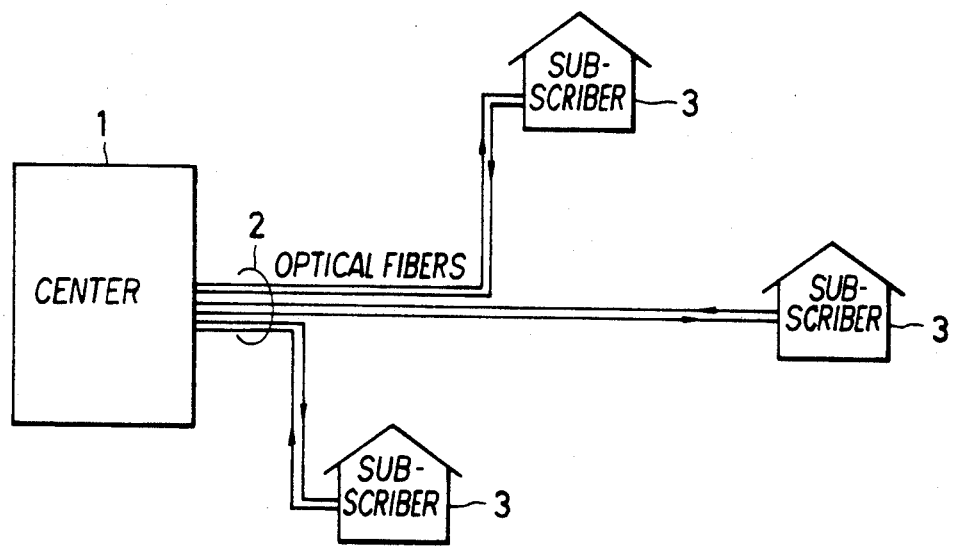
FIG. 1 is a diagram showing an example of arrangement of an optical subscriber network to which the present invention is applied.

The foregoing principle will be described with reference to FIG. 3. First, using a auxiliary fiber 2-3, a transmission line (a second downstream transmission line) which is larger in capacity than the original downstream transmission line including optical fiber 2-2 is constructed. Needless to say, the test of new second downstream line 2-3 does not require the interruption of any service. Since the second downstream transmission line 2-3 can transmit the information carried by the first downstream transmission line, 2-2 service can be continued by switching it over to the second line 2-3 immediately at the end of the test. Subsequently, the optical fiber 2-2 of the first downstream transmission line, which is now unnecessary for this transmission line, can be used as an auxiliary fiber to construct a second upstream transmission line. In this case, when the second upstream transmission line is constructed by substituting a transmitter 18 and a receiver 19 for a transmitter 12 and a receiver 13, respectively, an economical effect owing to the effective utilization of the existing facilities is attained. After the test of the second upstream transmission line including the demultiplexer is complete, the service of the first upstream transmission line can be borne by a part of the second upstream transmission line.

Thus, increases in the capacities of the transmission lines can be achieved without any interruption of services, or with a service interruption of very duration. An optical fiber 2-1 for the first upstream transmission line, which is now unnecessary, can be used as a auxiliary fiber for a further service enlargement in the future.

Now, a further embodiment of the present invention will be described with reference to FIGS. 4(a)-4(c), which shows a sequence of steps in upgrading transmission facilities.

FIG. 4(a) shows an example in which a second downstream transmission line is constructed using a auxiliary fiber with 2-3, e.g. as shown in FIG. 3. First, connections as shown are made to the spare fiber 2-3. For example, a three-way frequency-division multiplexer 54. A multiplexer 54 on a transmission has three input terminals. When the output of a multiplexer 17 is connected to the terminal 51, the services of a first downstream transmission line can be included in and transmitted by the second downstream transmission line. In this example, the terminal 52 is for a facsimile signal, and the terminal 53 is for a high-definition TV signal. The output signal of the multiplexer 54 is applied to a transmitter 55. This transmitter can transmit signals of larger capacity than a transmitter 18. The multiplexed signal is received by a receiver 56, the capacity of which is of course designed to be larger than that of a receiver 19. The received signal is demultiplexed by a demultiplexer 57, and the resulting signals are respectively applied to a facsimile set 31 and a high-definition TV receiving set. The second downstream transmission line can be tested without interrupting the services of a first upstream transmission line and the first downstream transmission line. The test can be conducted in such a way that a circuit equivalent to a demultiplexer 20 is connected to the first output terminal of the demultiplexer 57 in dummy fashion.

Next the arrangement shown in FIG. 4(b) is obtained. Starting in the example of FIG. 4(a), the output terminal of the multiplexer 17 is connected to the input terminal 51 of the multiplexer 54, while the input terminal of the demultiplexer 20 is connected to the first output terminal of the demultiplexer 57. Through the simple change-over, the services can be continued without interruption.

Meanwhile, the first downstream transmission line including an optical fiber 2-2 has the transmitter 18 attached to the subscriber side and the receiver 19 attached to the center side in a manner to be replaced with each other, and thus becomes a second upstream transmission line. A two-way multiplexer 32 for multiplexing voice and facsimile signals is added to the subscriber side, while a two-way demultiplexer 33 for demultiplexing both the signals is added to the center side, and these components are tested independently of the actual transmission lines 2-3 and 2-1.

FIG. 4(c) shows a state in which, in FIG. 4(b), the output terminals of a telephone set 11 and the facsimile set 31 on the subscriber side are connected to the input terminals of the multiplexer 32, while the output side of the demultiplexer 33 of the center is connected to an exchange etc. separately installed within the center. Such change-over can be effected without almost no interruption of the services. Thus, the work of changing-over the upstream transmission line from the first transmission line to the second transmission line of larger capacity is completed.

Incidentally, an optical fiber 2-1 which is now unnecessary can be used as a auxiliary fiber for a further system enlargement at the next time.

It will be understood that, when the auxiliary of the transmitter 18 and the receiver 19 can be used, the change-over can be executed at a time by the use of two auxiliary fibers.

Figure 5A:
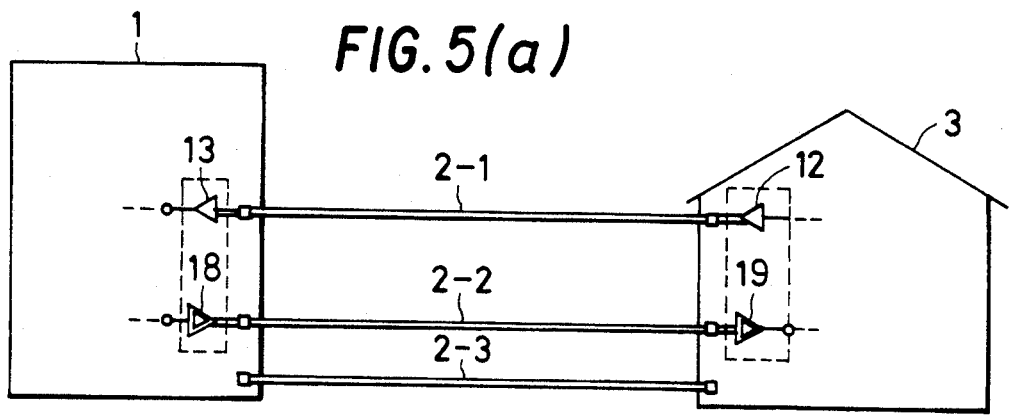

Moreover, the number of fibers to be used can be reduced using wavelength division multiplexers, i.e., in which a single fiber is effectively used as two or more, depending on the number of divisions of the bandwidth. This will be described with reference to FIGS. 5(a)–5(c). FIG. 5(a) shows the already-explained example which uses three fibers. In case of employing two-wavelength division multiplexers 60 and 61 as shown in FIG. 5(b), the same effect can be produced with only two fibers.

Figure 5B:
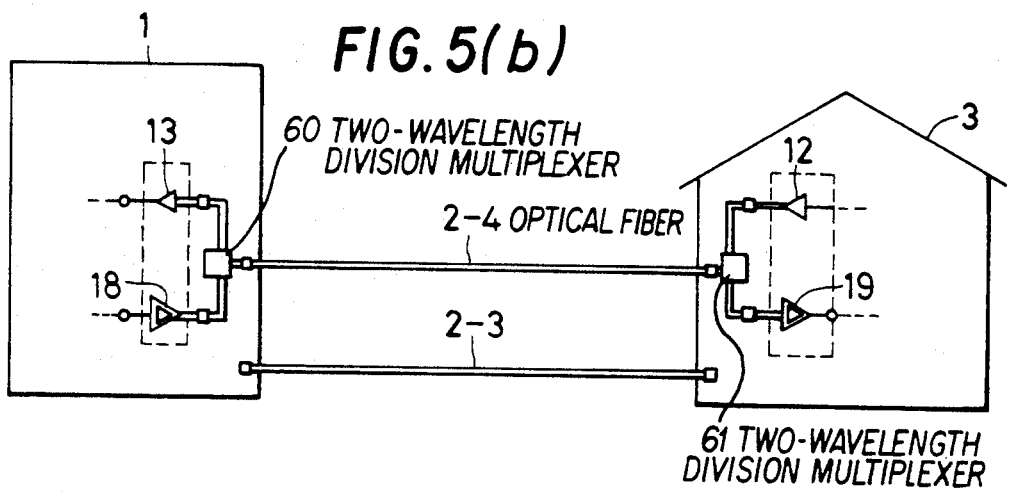
Figure 5C:
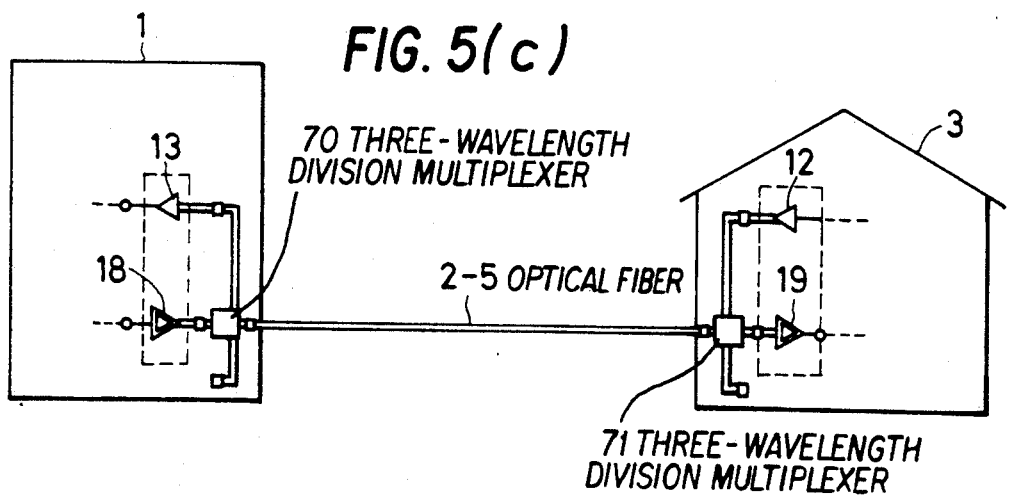

It will also be understood from FIG. 5(c) that a single fiber suffices when three-wavelength division multiplexers 70 and 71 are employed.

Whether the scheme of FIG. 5(b) or that of FIG. 5(c) is preferred, depends upon the prices of the wavelength division multiplexers. In a case where the difference of the prices of the two-wavelength division multiplexers and the three-wavelength ones is less than the price of one optical fiber, the adoption of the scheme of FIG. 5(c) is more advantageous.

Besides, in a case where, no auxiliary optical transmission line has been provided beforehand, optical wavelength division multiplexers can be inserted so simply that the period of time of service interruption is negligible, and the same effect as in the foregoing can be attained without constructing an auxiliary optical transmission line.

As described above, the present invention is very greatly effective in that the change-over work for enlarging the capacity of a subscriber, which has hitherto been normally involved a service interruption of several weeks in some cases, can be realized with an almost negligible interruption.

When the distances between the center and the subscribers are fairly short, the overall cost increase due to the addition of the auxiliary optical fiber is negligibly small, however when the distances are rather long the increased cost has greater influence.

Figure 6:
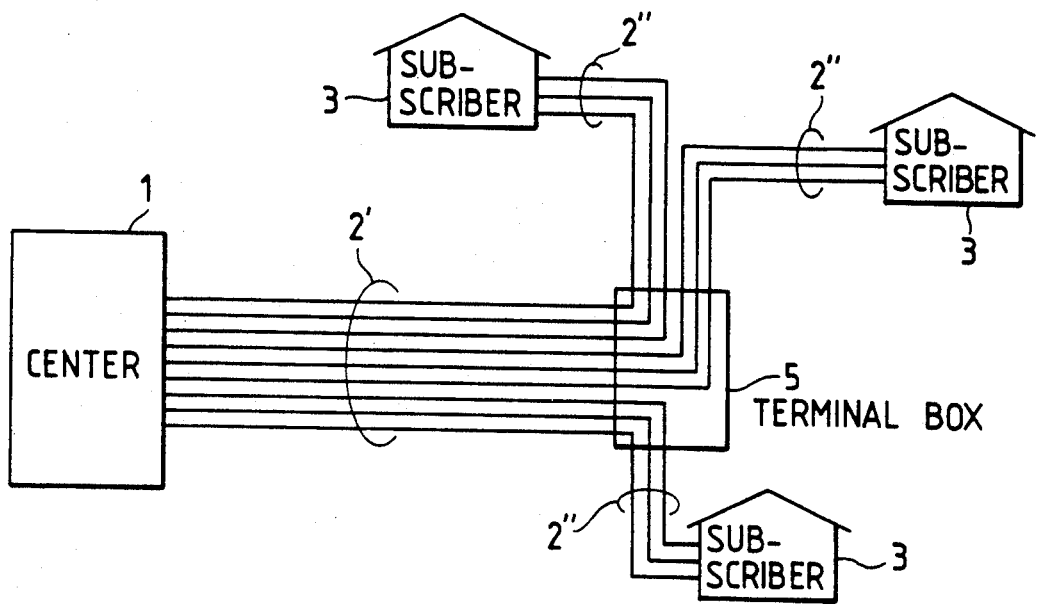
FIG. 6 shows an embodiment of the present invention having an individual auxiliary line for each subscriber.

That is, in the case where one auxiliary optical fiber is provided for each of the subscribers, as shown in FIG. 6, since ordinarily the distances from the terminal box 5 to the subscribers 3 are relatively short, the increase in the cost of the fibers 2" is negligibly small compared with the cost of the system. On the other hand, when the distance from the center 1 to the terminal 5 is long, the cost of the auxiliary optical fiber per subscriber becomes much higher.

As shown in FIG. 6, the fibers between the center 1 and the terminal box 5 are encased in a cable. Therefore, by the common use of fibers such as an auxiliary fiber which is temporarily used only for system extension, a more economical system can be established as compared to systems in which auxiliary fibers are permanently installed. In FIG. 6, three auxiliary fibers connected to different subscribers are provided in the section from the center 1 to the terminal box 5. However, even in the case of a long distance extending from the center 1 to the terminal box 5, the increased cost can be minimized by providing only one auxiliary fiber between the center 1 and the terminal box 5 for common use by a plurality of the subscribers. An embodiment of such a system will be described in reference to FIG. 7.

Figure 7:
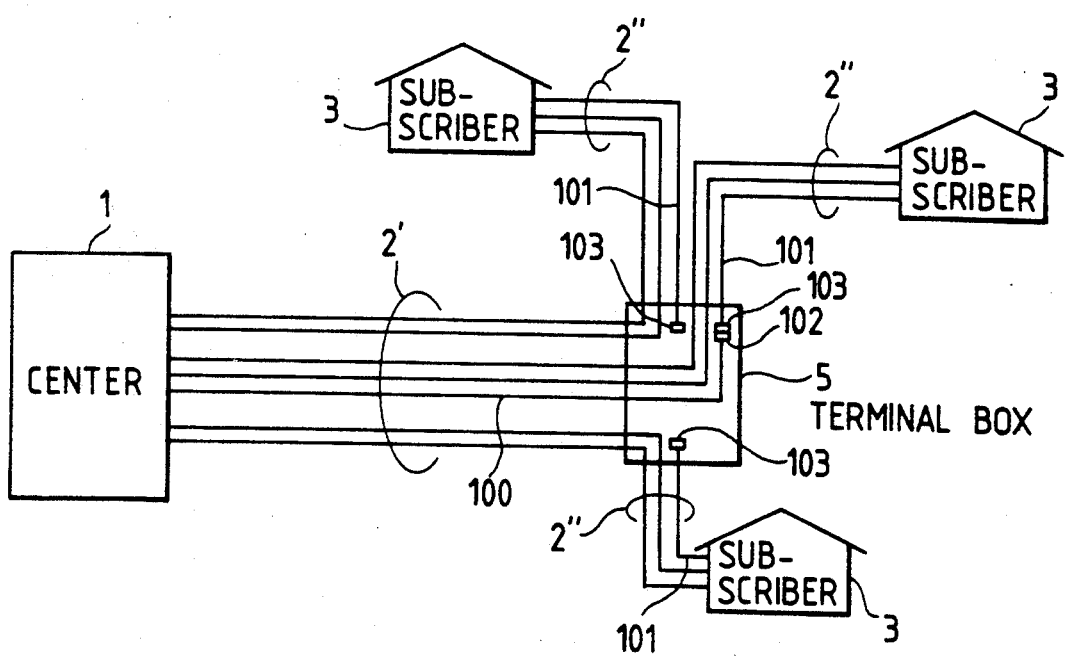
FIG. 7 shows an embodiment of the present invention using a common auxiliary line.

The system of FIG. 7 has a common auxiliary fiber 100 connected to an exclusive auxiliary fiber 101 through connectors 102 and 103. With this, the line test on the system extension is carried out. After the test, even when the common auxiliary fiber 100 is not used for transmission, the fiber 100 can be used again for the extension test for a new subscriber.

Referring now to FIG. 8, another embodiment is shown in which a common auxiliary fiber 100 is connected to another common auxiliary fiber 105 through connectors 102 and 102'. Accordingly, with the terminal box 5', the line test for a further system extension can be done. The fiber 105 also can be connected to another common auxiliary fiber through connectors 102" and 102''' and be used for the line test of a system extension at the next terminal box.

In the above description, only the auxiliary fibers are connected through connectors. Obviously, it is possible to provide a more flexible system by connecting the existing fibers through connectors.

Even though only one common auxiliary fiber is provided, a plurality of auxiliary fibers can be laid for more efficient system extension.

As will be understood from the above, according to the present invention, even though the distance between the center 1 and the terminal box 5 is rather long, an economical system can be achieved, providing substantial practical benefits.

What is claimed is:

1. An optical network system comprising:
    a communication center having a first transmitter for sending a downstream information and a first receiver for receiving an upstream information;
    a subscriber having a first receiver connected with said communication center first transmitter by a first optical transmission line, for receiving information from said communication center and having a first transmitter connected with said communication center first receiver, by a second optical transmission line, for sending information to said communication center; and
    means for installing a second transmitter in said center and a second receiver in said subscriber, establishing an optical transmission line connected between said center second transmitter and said subscriber second receiver, while maintaining continuous transmission of said upstream and downstream information, said means consisting of
    an auxiliary optical transmission line extending from said center to said subscriber, having a connection means at said center and a connection means at said subscriber, whereby
    when said center second transmitter is connected to the center connection means of said auxiliary optical line and said subscriber second receiver is connected to the subscriber connection means of said auxiliary optical line, said center first transmitter and said subscriber first receiver are disconnected from said first optical transmission line which now becomes the new auxiliary line, said auxiliary line becomes the new first optical transmission line and downstream information is sent from said center to said subscriber via said center second transmitter, said new first optical transmission line and said subscriber second receiver.

2. An optical network system according to claim 1, wherein each of said first, second and auxiliary optical transmission lines is constructed of an optical fiber.

3. An optical network system according to claim 1, wherein said first and second optical transmission lines are constructed of a single optical fiber and two-way optical wavelength division multiplexers are connected at both ends of said optical fiber.

4. An optical network system according to claim 1, wherein said first, second and auxiliary optical transmission lines are constructed of a single optical fiber and three-way optical wavelength division multiplexers are connected at both ends of said optical fiber.

5. An optical network system comprising:
a communication center having a first transmitter, a second transmitter, a first receiver, and a second receiver;
a first and a second subscriber, each having a transmitter and a receiver;
a first downstream and a second downstream optical transmission line, for transmitting information from said center first transmitter to said first subscriber receiver and from said center second transmitter to said second subscriber receiver, respectively;
a first upstream optical transmission line, for transmitting information from said first subscriber transmitter to said center first receiver, respectively;
a second upstream optical transmission line, for transmitting information from said second subscriber transmitter to said center second receiver;
means for substituting any from among said first subscriber receiver and said second subscriber receiver with a substitute receiver, and for substituting, with a substitute transmitter, the one from among said center first and second transmitters which corresponds to the one from among said first subscriber receiver and said second subscriber receiver which is substituted, while maintaining substantially continuous transmission of information between said center and said any subscriber, comprising:
a third optical transmission line extending from a center termination point at said center to a primary termination point at a terminal box which is remote from said center and said first and second subscriber, said center termination point having means for connecting a temporary transmitter;
a first auxiliary optical transmission line connected between a first termination point at said terminal box and an auxiliary line termination point at said first subscriber, said auxiliary line termination point having means for connecting a temporary receiver;
a second auxiliary optical transmission line connected between a second termination point at said terminal box and an auxiliary line termination point at said second subscriber, said auxiliary line termination point having means for connecting a temporary receiver;
and means for connecting said terminal box primary termination point selectively to any from among said first and second terminal box termination points, whereby when substituting the receiver in a selected one from among said first and second subscribers and substituting the one from among said center first and second transmitters which corresponds to said selected subscriber, the terminal box primary termination point is connected to the terminal box termination point corresponding to said selected subscriber, a temporary receiver is connected to the auxiliary line termination point connection means in said selected subscriber and a temporary transmitter is connected to said center termination point connection means, thereby providing a path for maintaining substantially continuous information transfer from said center to said subscriber while the receiver in said selected subscriber and said corresponding transmitter in the center are substituted.

6. An optical network system according to claim 5, wherein said first and second optical transmission lines are made up of optical fibers.

7. An optical network system according to claim 5, wherein a given section of said first and second optical transmission lines is a single optical fiber common to both said first and second lines and a multiplexing-/demultiplexing device is connected to the ends of said single optical fiber.

8. An optical network system according to claim 5, wherein a given section of said first, second and third transmission lines is a single optical fiber common to said first, second and third lines and a multiplexing-/demultiplexing device is connected to the ends of said single optical fiber.

9. A method of upgrading an optical network system having a communication center for sending and receiving information, a subscriber for sending and receiving information, a first downstream transmission line, one end of which connects a first transmitter of the center and the other end connects a first receiver of the subscriber for transmitting information from the center to the subscriber, a first upstream transmission line, one end of which connects a first receiver of the center and the other end connects a first transmitter of the subscriber for transmitting information from the subscriber to the center, the method comprising the steps of:
constructing a second downstream transmission line, one end of which connects a second transmitter of the center and the other end connects a second receiver of the subscriber, using a first auxiliary optical transmission line which is connected between the center and the subscriber;
constructing a second upstream transmission line, one end of which connects a second receiver of the center and the other end connects a second transmitter of the subscriber, using said first downstream transmission line after removing the first transmitter of the center and the first receiver of the subscriber; and
constructing a second auxiliary optical transmission line using the first upstream transmission line after removing the first transmitter of the subscriber and the first receiver of the center.

10. A method of upgrading an optical network system according to claim 9, wherein said removed first transmitter of the center is used as said second transmitter of the subscriber and said removed first receiver of the subscriber is used as said second receiver of the center.

11. An optical network system according to claim 1 further comprising:
means for installing a second receiver in said center and a second transmitter in said subscriber, establishing an optical transmission line connected between said center second receiver and said subscriber second transmitter, while maintaining continuous transmission of said upstream and downstream information, said means consisting of said new auxiliary optical line extending from said center to said subscriber, whereby when said center second receiver is connected to the end of said new auxiliary optical line located at said center and said subscriber second transmitter is connected to the end of said new auxiliary optical line located at said subscriber, said upstream information is sent from said subscriber to said center via said subscriber second transmitter, said new auxiliary optical line and said center second receiver.

12. An optical network system for changing transmission capacity while maintaining continuous operation comprising:
 (a) a center having a transmitter and receiver, each having a given capacity, for sending and receiving information, respectively;
 (b) a subscriber having a transmitter and a receiver, each having a given capacity, for sending and receiving information, respectively;
 (c) a first optical transmission line connecting the receiver of said subscriber to the transmitter of said center;
 (d) a second optical transmission line connecting the transmitter of said subscriber to the receiver of said center for transmitting information from said subscriber to said center;
 (e) an auxiliary optical transmission line extending from said center to said subscriber, having a connection means at said center and said subscriber;
 (f) a second transmitter of a capacity larger than said given capacity of said center transmitter connected to said auxiliary transmission line at said center;
 (g) a second receiver of a capacity larger than said given capacity of said subscriber receiver, connected to said auxiliary transmission line at said subscriber, whereby said second transmitter and said second receiver are operationally connected via said connection means to said auxiliary line prior to the time that said transmitter of said center and said receiver of said subscriber are disconnected from said first optical line.

* * * * *